Jan. 2, 1968  A. J. ESTEP  3,360,877
METHOD OF AND ARTICLE FOR IDENTIFYING ANIMALS
Filed Aug. 17, 1965
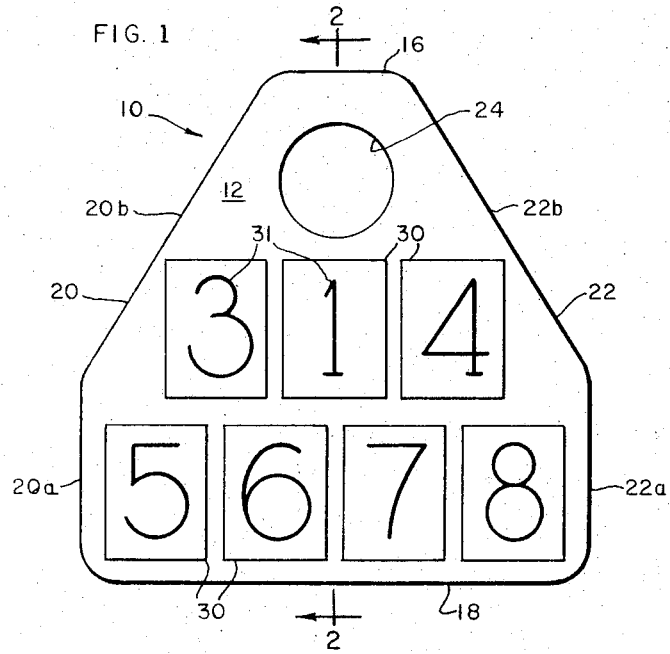
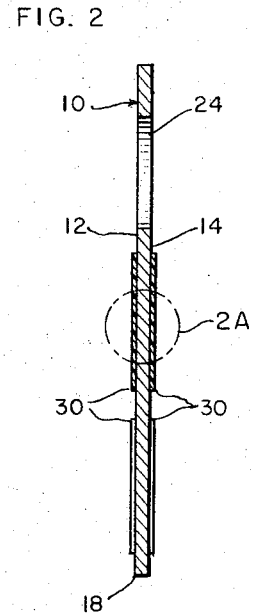
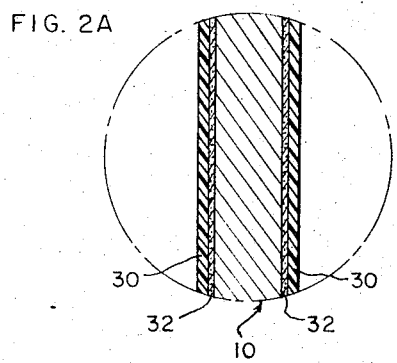
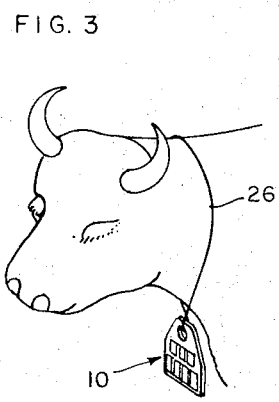
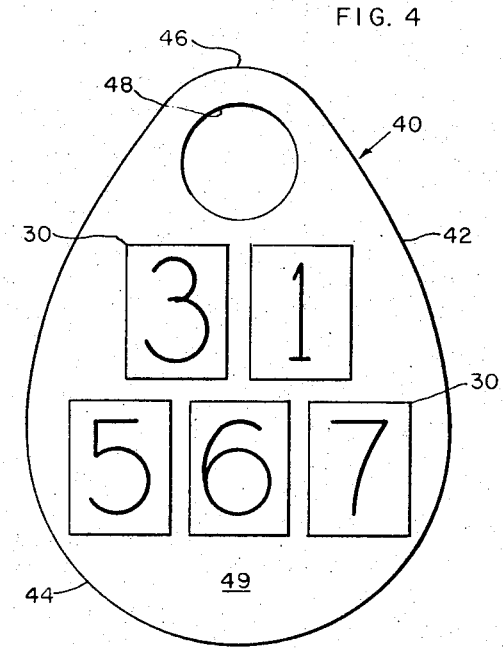
ALLEN J. ESTEP
INVENTOR
BY
BUCKHORN, BLORE, KLARQUIST & SPARKMAN
ATTORNEYS

United States Patent Office 3,360,877
Patented Jan. 2, 1968

3,360,877
METHOD OF AND ARTICLE FOR IDENTIFYING ANIMALS
Allen J. Estep, 9512 NW. 29th Ave., Vancouver, Wash. 98665
Filed Aug. 17, 1965, Ser. No. 480,295
1 Claim. (Cl. 40—300)

ABSTRACT OF THE DISCLOSURE

The present application discloses an animal identification tag in the form of a flat, thin plate made of anodized aluminum and having an opening near one edge for receiving a neck chain. Removable, pressure sensitive, plastic adhesive tape patches each bearing a numeral are affixed to both faces of the tag. The numerals are arranged in two rows, one row identifying the animal from which the tag-bearing animal was sired, and the other row identifying the tag-bearing animal in its herd.

---

The present invention relates to a method of and article for identifying animals, and more particularly to a method of and a neck tag for coding livestock, and especially cattle.

An important aspect of raising both beef and dairy cattle is the keeping of accurate records of each animal from the time it is acquired to the time that it is removed from the heard. It is common practice, for example, to assign to each animal in the herd an identification number and to apply such number to a tag which is worn by the animal on a chain about its neck. It is also common practice to keep an accurate record of the ancestry of each animal including the bull from which the animal was sired to facilitate selective breeding and other practices.

Heretofore cattle tags have borne only a single number to identify the tagged animal in its herd. Such tags have not identified the bull from which the animal was sired, it being necessary to refer to the animal's detailed records for this purpose, which is often a laborious and time-consuming procedure subject to error. Another disadvantage of prior cattle tags is that the identifying numeral has been marked permanently thereon. Thus, when an animal is removed from the herd, its tag is either discarded, necessitating purchase of a new tag for each animal added to the herd, or the same tag is applied to another animal, resulting in two or more animals in succession bearing the same identifying number and therefore further complicating record-keeping.

Accordingly, a primary object of the present invention is to provide a method of coding animals whereby each animal is immediately identifiable on sight, both as to the animal from which it was sired and as to its identity within the herd.

Another primary object of the invention is to provide a new and improved tag for identifying animals that is reusable with different indicia for each successive animal wearing the tag.

A more specific object of the invention is to provide a new and improved cattle tag as aforesaid which identifies an animal both with respect to the bull from which it was sired and with respect to its identity within the herd.

Another specific object of the invention is to provide a new and improved cattle tag having removable and replaceable indicia.

Still another object of the invention is to provide a new and improved reusable cattle tag which is both weatherproof and unaffected by silage acids.

A further object is to provide a cattle tag as aforesaid, the indicia of which cannot be removed from the tag except by the application of a positive peeling force.

Another object is to provide a cattle tag which makes possible positive identification of an animal and its sire at a considerable distance from the animal.

Another object is to provide a cattle tag as aforesaid which is inexpensive to produce.

The above and other advantages of the present invention will become more apparent from the following detailed description which proceeds with reference to the accompanying drawing wherein:

FIG. 1 is a front view of one face of a cattle tag in accordance with the present invention;

FIG. 2 is a vertical sectional view taken along the line 2—2 of FIG. 1;

FIG. 2A is an enlarged sectional view of a portion of FIG. 2 bounded by the closed line 2A of FIG. 2;

FIG. 3 is an illustration of the tag of FIG. 1 secured about the neck of a cow; and FIG. 4 is a front view of one face of a modified form of tag in accordance with the present invention.

With reference to the drawing, FIG. 1 shows a tag especially adapted for cattle, such tag including a flat, plate-like member 10 made of material which is both weatherproof and resistant to silage acids and to which indicium-bearing patches as described hereinafter will readily adhere. It has been found that members made of anodized aluminum fulfill admirably the above requirements. The member includes opposed broad, flat faces 12 and 14 bounded by a short top edge 16, a long bottom edge 18 and side edges 20 and 22 extending from the bottom edge to the top edge. More specifically, the side edges include lower, normal side edge portions 20a and 22a which intersect the bottom edge 18 at right angles thereto, and upper, inclined side edge portions 20b, 22b which intersect their respective normal side edge portions and taper inwardly from the upper extremities of the latter to the upper edge 16. The inclined side edge portions are nearly twice the length of the normal side edge portions. The member is provided with an opening 24 therethrough adjacent the top edge 16 and between the upper side edge portions 20b and 22b for receiving a neck chain 26 (FIG. 3) for securing the tag about an animal's neck.

Affixed to each broad face 12, 14 of the member are a plurality of generally rectangular tape patches 30. Each patch has permanently printed on its front face a single indicium 31, in this instance a numeral, and has a layer 32 of adhesive backing on the reverse face as shown clearly in FIG. 2A. The patches themselves are made of plastic material that is unaffected by exposure to weather extremes and silage acids over prolonged periods of time. One such tape material that has proved successful in actual tests over several years' time has been "Scotch-Cal" brand tape manufactured by Minnesota Mining and Manufacturing Company. This tape can be purchased in large sheets which can then be printed with a series of indicia. The sheets can then be cut into indicium-bearing patches as desired by the person ultimately using the tags.

As shown in FIG. 1, the patches are applied to the member 10 in two horizontal rows beneath the opening 24, with the patches in each row being arranged so that the indicia thereon identify a given characteristic of the animal to which the tag is applied. For example, the patches in the upper row of FIG. 1 are arranged such that the combination of numerals identify the bull from which a given animal was sired, whereas the combination of numerals on the patches in the lower row identifies the animal itself in its herd. Thus the numeral 314 of the upper row would indicate that the animal was sired from bull No. 314 and the animal is No. 5678 in its herd. The numerals are preferably of large enough size and printed on a contrasting background of the patch so that they can readily be observed by persons having normal eyesight at a considerable distance from the animal, preferably exceeding 25 feet and up to 40 to 50 feet.

The tag should be of sufficient breadth where the rows of patches are applied as compared to the width of the patches so that at least three patches can be applied in the upper row and four patches applied in the lower row whereby the same numerals would normally never have to be used to identify more than one animal in the herd. It will be evident from FIG. 1 that the length of the tag below the opening 24 and the lengths of the patches are interrelated to provide sufficient space for just two rows of patches below the opening.

It has been found that a tag having a bottom edge length of approximately three and three-fourths inches, a top edge length of approximately one inch, an overall length of four inches and a length below the opening of two and one-half inches, with patches measuring approximately three-fourths of an inch wide and one inch long will fulfill the above requirements.

An advantage of using anodized aluminum for the member is that it has sufficient weight so that the tag will naturally hang beneath the neck of an animal with a minimum tendency to flop about, while having insufficient weight to be a noticeable burden to the animal. As previously noted, anodized aluminum also appears to provide the best adhering surface for plastic tape patches of the type recommended above.

When a tagged animal is removed from the herd, the tag is removed from the animal and the indicia-bearing patches are peeled or scraped from the surfaces of the tag. Thereafter new indicia-bearing patches are applied, with the indicia being selected and arranged to identify a different animal to which the tag will next be attached. Thus, each tag can be used indefinitely by changing indicia patches each time the tag is passed on from one animal to another. Also, there is never a need for two animals in a herd to bear the same number, either at the same time or successively.

FIG. 4 discloses a modified form of tag 40 having a generally tear-drop shape with curved side edges 42 merging with a broad rounded bottom edge 44 and tapering to a sharply rounded top edge 46. This tag has an opening 48 for the same purpose as the opening in the tag of FIG. 1, and broad, flat, opposed surfaces 49 beneath the opening for receiving on each surface two rows of the indicia-bearing patches 30 as before. Although the tag shown in FIG. 4 has only two patches in its upper row and three in its lower row, there is sufficient surface area provided for receiving an additional patch in each row if and when required.

Summarizing the method of the invention, it will be seen that there is provided a unique method of coding animals, and specifically cattle, both as to the bull from which it was sired and as to its identity in the herd, by providing a weatherproof and silage-acid resistant neck tag and a group of indicia-bearing patcches, with each patch bearing only a single indicium on one face and adhesive on its opposite face. The patches are arranged in two rows on each face, with the patches in one row being selected and arranged to indicate the animal from which the tagged animal was sired and with the patches in the other row being selected and arranged to identify the tagged animal within its herd.

It will be apparent that various changes may be made in the details of the above-described preferred embodiments of the present invention without departing from the inventive concept disclosed. Specifically the scope of my invention should not be limited by the foregoing description but should be determined only by the following claim.

I claim:

1. A tag for identifying cattle and other livestock comprising:

a thin, flat plate-like member of anodized aluminum, said member having broad, flat, opposed faces, a top edge, a bottom edge and opposed side edges, said member having an opening therethrough adjacent said top edge and between said side edges for receiving a neck band for attaching said member to the neck of an animal, a plurality of thin, rectangular, scuff, silage acid and weather resistant plastic tape patches, each of said patches having a white or correspondingly light-colored front surface with a single, black or other correspondingly dark indicium permanently imprinted thereon and a back surface coated throughout with a pressure-sensitive adhesive layer, said patches being arranged and affixed in side-by-side relationship in two horizontal rows on both of the opposite faces of said member beneath said opening, the adhesive of said patches being selected so that each patch is strippable from its adhering surface upon application of a positive peeling force thereto but being resistant to removal by normal environmental factors during usage, the front surfaces of said patches being exposed to the ambient air while affixed to said member, the patches in one of said two rows being selected and arranged so as to identify the male animal from which the tagged animal was sired, the patches in the other of said two rows being selected and arranged so as to identify the tagged animal in its herd, said tag being reusable on different animals after removal of the same from a first animal by peeling said patches from said member and discarding said patches and then reapplying new patches to the same said member so as to identify a second animal as aforesaid before attaching said tag to the second animal.

References Cited

UNITED STATES PATENTS

| | | | |
|---|---|---|---|
| 1,259,787 | 3/1918 | Segall | 40—125 |
| 1,318,821 | 10/1919 | Wilson | 40—300 |
| 1,374,443 | 4/1921 | Giordano | 40—301 |
| 2,699,103 | 1/1955 | Stasikewich | 40—125 |
| 2,924,198 | 2/1960 | McMurray | 40—300 X |
| 2,785,087 | 3/1957 | Franer et al. | 117—685 |

EUGENE R. CAPOZIO, *Primary Examiner.*

W. GRIEB, *Examiner.*

UNITED STATES PATENT OFFICE
CERTIFICATE OF CORRECTION

Patent No. 3,360,877                                  January 2, 1968

Allen J. Estep

It is hereby certified that error appears in the above numbered patent requiring correction and that the said Letters Patent should read as corrected below.

Column 3, line 57, for "patcches" read -- patches --; column 4, line 57, for "685" read -- 68.5 --; same column 4, list of References Cited, insert the following reference:

2,914,166     11/1959     Bihler ------ 177-68.5UXR

Signed and sealed this 18th day of February 1969.

(SEAL)
Attest:

Edward M. Fletcher, Jr.

Attesting Officer

EDWARD J. BRENNER

Commissioner of Patents